(12) United States Patent
Halberstadt

(10) Patent No.: US 9,219,419 B2
(45) Date of Patent: Dec. 22, 2015

(54) SWITCHED MODE POWER SUPPLIES

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 157 days.

(21) Appl. No.: 14/043,377

(22) Filed: Oct. 1, 2013

(65) Prior Publication Data

US 2014/0098578 A1   Apr. 10, 2014

(30) Foreign Application Priority Data

Oct. 5, 2012  (EP) ..................................... 12187543

(51) Int. Cl.
*H02M 7/217*  (2006.01)
*H02M 3/335* (2006.01)

(52) U.S. Cl.
CPC ...... *H02M 3/33507* (2013.01); *H02M 3/33515* (2013.01); *H02M 3/33523* (2013.01); *H02M 3/33592* (2013.01); *Y02B 70/1475* (2013.01)

(58) Field of Classification Search
CPC . H02M 1/40; H02M 3/1582; H02M 3/33523; H02M 2001/0064; H02M 3/00; H02M 3/33576
USPC ............... 363/17, 21.03, 21.06, 21.12, 21.14, 363/21.17; 307/28, 39, 58, 82, 87, 116
See application file for complete search history.

(56) References Cited

U.S. PATENT DOCUMENTS

| 3,986,097 | A  |   | 10/1976 | Woods |
|---|---|---|---|---|
| 5,424,932 | A  | * | 6/1995  | Inou .................. H02M 3/33561 363/127 |
| 5,539,805 | A  | * | 7/1996  | Bushue et al. ................ 379/361 |
| 5,815,381 | A  |   | 9/1998  | Newlin |
| 5,859,524 | A  |   | 1/1999  | Ettes |
| 5,949,659 | A  |   | 9/1999  | Lesche |
| 6,069,804 | A  | * | 5/2000  | Ingman ................. H02J 7/0068 363/124 |
| 6,342,737 | B1 | * | 1/2002  | Brodeur ............ H02M 3/33561 307/87 |
| 6,490,183 | B2 | * | 12/2002 | Zhang ............... H02M 3/33592 363/127 |
| 6,549,432 | B1 |   | 4/2003  | Giannopoulos et al. |
| 7,362,593 | B2 | * | 4/2008  | Yang .................. H02M 3/33507 363/21.13 |

(Continued)

FOREIGN PATENT DOCUMENTS

| CH | 679196 A5 | 12/1991 |
|---|---|---|
| CN | 101242146 A | 8/2008 |
| CN | 101604915 A | 12/2009 |

OTHER PUBLICATIONS

Prodic, A. et al."Digital Controller Chip Sset for Isolated DC Power Supplies", Proc. IEEE APEC Conf., vol. 2, pp. 866-872 (Feb. 2003).

(Continued)

*Primary Examiner* — Rajnikant Patel

(57) ABSTRACT

An example embodiment relates to a switched-mode power supply comprising a transformer with a first winding and a second winding. There is a transmitter configured to: detect a detectable variable (Vout) at the first winding, generate a transformer relayed signal in accordance with the detectable variable (Vout), and provide the transformer relayed signal to the first winding. A receiver is configured to: receive the transformer relayed signal from the second winding, and control a controllable variable at the second winding in response to the transformer relayed signal, wherein the transformer relayed signal is a symbol stream comprising a plurality of symbols.

20 Claims, 10 Drawing Sheets

(56) References Cited

U.S. PATENT DOCUMENTS

| | | |
|---|---|---|
| 7,835,163 B2 | 11/2010 | Chou |
| 8,125,799 B2 | 2/2012 | Zhu et al. |
| 2011/0062793 A1* | 3/2011 | Azancot et al. ............... 307/116 |

OTHER PUBLICATIONS

Extended European Search Report for EP Patent Appln. No. 12187543.9 (2-3-7-2013).

* cited by examiner

SWITCHED MODE POWER SUPPLIES

CROSS-REFERENCE TO RELATED APPLICATIONS

This application claims the priority under 35 U.S.C. §119 of European patent application no. 12187543.9, filed on Oct. 5, 2012, the contents of which are incorporated by reference herein.

The present disclosure relates to switched mode power supplies. Specifically, although not exclusively, the disclosure relates to switched-mode power supplies with mains isolation and to flyback converters with synchronous rectification.

It is often needed to send information from the isolated secondary side of a power supply to the primary side. For example, information about the deviation of the output from a regulated value that is used to control the power to be converted may be sent.

According to a first aspect of the invention, there is provided a switched-mode power supply comprising:
  a transformer with a first winding and a second winding;
  a transmitter configured to:
    detect a detectable variable at the first winding,
    generate a transformer relayed signal in accordance with the detectable variable, and
    provide the transformer relayed signal to the first winding; and
  a receiver configured to:
    receive the transformer relayed signal from the second winding, and
    control a controllable variable at the second winding in response to the transformer relayed signal.

The transformer relayed signal may be a symbol stream comprising a plurality of symbols.

Such a switched mode power supply (SMPS) can enable control information to be encoded onto the transformer relayed signal and passed across the transformer, whilst maintaining mains isolation between them, without requiring a significant number of additional components. The control information can be sophisticated inasmuch as it can provide more than a single bit's worth of information. The symbol stream may be a bit stream.

The first winding may be a secondary side winding of the transformer. The second winding may be a primary side winding of the transformer. The switched-mode power supply may further comprise a power switch coupled in series with the primary side winding. The controllable variable may relate to a state of the power switch, which may be in an open or closed state.

An auxiliary winding may be provided as a primary or secondary side winding. That is, the first or second winding may be an auxiliary winding.

The switched-mode power supply may further comprise a secondary side switch coupled in series with the secondary side winding. The secondary side switch may be a rectification switch. The transmitter may generate a transformer relayed signal by operating the rectification switch.

The transmitter may be configured to operate the secondary side switch during a ringing time in the operation of the switched-mode power supply.

The transmitter may be configured to operate the secondary side switch at an instant at, or adjacent to, a maxima or minima in a voltage across the secondary winding during a ringing time in the operation of the switched-mode power supply.

The transmitter may be configured to provide at least a portion of the symbol stream during a ringing time between a secondary stroke of a cycle and a primary stroke of a next cycle of the switched-mode power supply and to provide a further portion of the symbol stream during a ringing time between a secondary stroke of the next cycle or a subsequent cycle and a primary stroke of a cycle after the next or subsequent cycle.

The second winding may be a secondary side winding of the transformer and the first winding is a primary side winding of the transformer. The switched-mode power supply may further comprise a secondary side switch coupled in series with the secondary side winding. The controllable variable may relate to a state of the secondary side switch, which may be in an open or closed state.

The controllable variable may relate to the operation of a current source.

The controllable variable may be indicative of a period or a frequency of a pulse to be provided to at the second winding or to an instant when the pulse should be provided to the second winding.

The transmitter may be configured to generate a transformer relayed signal by operating a communication current source in order to adjust the voltage across the first winding in accordance with detectable variable.

According to a further aspect, there is provided a switched-mode power supply comprising:
  a transformer with a first winding and a second winding;
  a communication current source associated with the first winding;
  a transmitter associated with the first winding, the transmitter configured to operate the communication current source in order to adjust (increase or decrease) the voltage across the first winding in accordance with information to be communicated to the second winding, thereby generating a transformer relayed signal; and
  a receiver associated with the second winding, the receiver configured to:
    receive the transformer relayed signal from the second winding, and
    control a controllable variable at the second winding in response to the transformer relayed signal.

Such a transformer relayed signal is a convenient implementation for communicating information either from a primary winding to a secondary winding or from a secondary winding to a primary winding.

The transmitter may be configured to operate the communication current source in order to adjust the voltage across the first winding during a ringing time between a secondary stroke of a cycle and a primary stroke of a next cycle of the switched-mode power supply.

The controllable variable may be the operation of a switch, which may be a power switch at a primary side of the transformer or a secondary side switch at a secondary side of the transformer.

The current source may be configured to provide an alternating current with a carrier frequency. The transmitter may be configured to modulate the carrier frequency in accordance with the information to be communicated to the second winding in order to provide the transformer relayed signal.

The switched mode power supply may be a bidirectional flyback converter.

The first winding may be a primary winding and the second winding may be a secondary winding. The switched mode power supply may further comprise a secondary side switch in series with the secondary winding. The receiver may be configured to control the state of the secondary side switch in order to close the secondary side switch before the start of a secondary stroke of the switched mode power supply in accordance with the transformer relayed signal.

The receiver may be configured to identify an unexpected change in the voltage across the second winding in order to receive the transformer relayed signal. That is, the receiver may identify a change that is in addition to a variation in the voltage that would be expected at that time in the ringing period.

The detectable variable may be indicative of one of: a voltage, a power, or a current.

The transmitter may be configured to provide the transformer relayed signal during a ringing time between a secondary stroke of a first cycle and a primary stroke of a next cycle of the switched-mode power supply.

The transformer relayed signal may comprise an additional change of a current in, or voltage across, a winding of the transformer.

According to a further aspect, there is provided a switched-mode power supply comprising:
- a transformer with a primary side winding and a secondary side winding;
- a secondary side switch coupled in series with the secondary side winding;
- a transmitter configured to:
  - detect a detectable variable at the primary side winding,
  - generate a transformer relayed signal in accordance with the detectable variable, and
  - provide the transformer relayed signal to the primary side winding; and
- a receiver configured to:
  - receive the transformer relayed signal from the secondary side winding, and
  - operate the secondary side switch in response to the transformer relayed signal.

There may be provided a battery charger comprising any switched-mode power supply disclosed herein There may be provided a computer program, which when run on a computer, causes the computer to configure any apparatus, including a switched mode power supply, circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

A description is now given, by way of example only, with reference to the accompanying drawings, in which.

In switched mode power supplies with mains isolation and control at the primary side of a transformer, it can be necessary to sense the output variable to be regulated. For example, output voltage, output current or output power may be regulated to be at a desired level. This regulation is often performed by sensing the output variable, comparing it with a reference value at the secondary side of the transformer and sending an error signal generated from the difference between the output variable and the reference value from the secondary side to the primary side. An example of such a converter 100 is given in FIG. 1.

Figure 1:
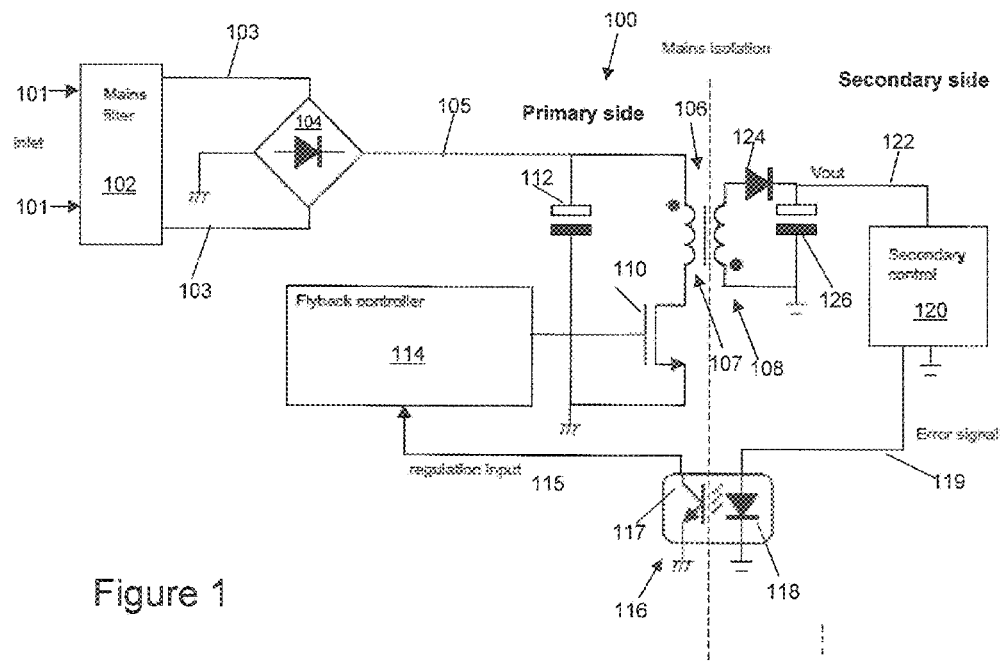
FIG. 1 illustrates a prior art flyback converter.

FIG. 1 illustrates a prior art flyback converter 100 that senses an output variable, generates an error signal 119, and sends the error signal 119 to the primary side of the flyback converter via an opto-coupler 116.

In FIG. 1 an AC power supply signal 101 is provided to a mains filter 102, which prevents high frequency noise produced by the switching actions inside the converter from reaching the power supply signal 101. The converter power signal 103 is provided to a bridge rectifier 104 which in this example provides full wave rectification of the converter power signal 103. A rectified signal 105 is provided by the bridge rectifier 104 to a first terminal of a primary winding 107 of a transformer 106. A second terminal of the primary winding 107 of the transformer 106 is coupled to ground via the conduction channel of a switch. In this example, the switch is provided as a field effect transistor 110 with the conduction channel being the source-drain path of the transistor 110. The transistor switch 110 may be referred to as a power switch.

The first terminal of the primary winding 107 is also coupled to ground by a capacitor 112. The effect of this capacitor 112 is to smooth the rectified signal 105 supplied to the primary winding.

The gate of the power switch, or transistor switch 110 is controlled by a flyback controller 114, which varies the gate potential in accordance with a regulation input signal 115 received from the opto-coupler 116. It will be appreciated that the opto-coupler 116 may be used to maintain the electrical isolation between the primary side and the secondary side of the transformer 106.

The opto-coupler 116 has a primary side sensor 117 which provides the regulation input signal 115 to the controller 114. The opto-coupler 116 also has a secondary side emitter 118 that receives an error signal 119. The error signal 119 is determined by a secondary side controller 120, which receives an output signal 122 of the flyback converter from the secondary winding 107. The error signal 119 may be a signal that provides information necessary to control the primary winding 107 or purely be indicative of the divergence in the output signal 122 from the desired value.

A first terminal of the secondary winding 108 is coupled to a terminal of an output diode 124 that is configured to allow conventional current to flow away from the first terminal of the secondary winding 108. The second terminal of the output diode 124 is coupled to a first plate of an output capacitor 126 (this output capacitor can also be referred to as an elcap). The second plate of the output capacitor 126 is coupled to both a second terminal of the secondary winding 108 and the ground. The output signal 122 is provided at the junction between the output diode 124 and the output capacitor 126.

A disadvantage of using an opto-coupler is that the opto coupler should be biased with a current of a few mA in order to prevent undefined and slow behaviour. The opto-coupler also consumes a dark current, which can be in the order of 50 µA. This dark current is an offset added to the desired signal. A result of the dark current is that the level of the regulation input should be at least as large as the dark current, to guarantee that at zero input current of the opto-coupler input, the maximum power for the SMPS can be set. Opto-couplers may be used in switch mode power supplies where a degradation of the current transfer ratio (CTR) is acceptable at low bias currents. For example, at a current of 100 µA at the opto-coupler output, the CTR typically drops to 0.2 at worst case conditions, giving the need to drive the LED side of the opto-coupler with 500 µA. For a power supply with a 19 V output and 15 V supply voltage at the primary side to supply the opto-coupler, the power loss for driving the opto-coupler is at least 10 mW. In such a situation, it is rather difficult to meet a no load power consumption requirement of 30 mW.

Another disadvantage of using opto-couplers to transfer information between the primary and secondary sides of the transformer is the cost and PCB area of additional circuitry required for communication using the opto-coupler.

For some applications, the opto-coupler 116 and secondary side controller arrangement 120 may be too expensive. This may be particularly true in the low power adapter and LED driver markets. Therefore, it may be desirable to provide a switching circuit that does not require an opto-coupler.

Figure 2:
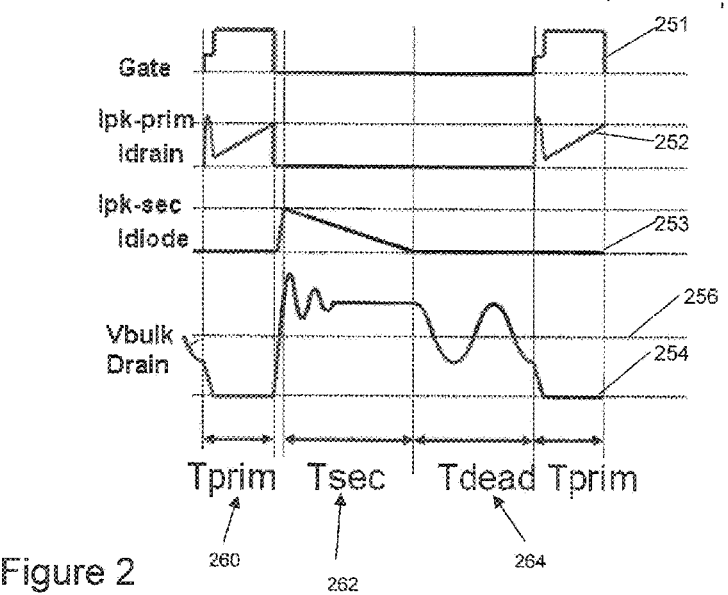
FIG. 2 illustrates profiles of several signals within a flyback converter.

FIG. 2 illustrates profiles of several signals within a flyback converter in discontinuous conduction mode (DCM). In DCM or boundary conduction mode (BCM), the current in the secondary circuit is high at the start of the secondary stroke and gradually reduces to zero at the end of the secondary stroke 262.

A complete switching cycle is shown in FIG. 2, and consists of three periods; a primary stroke 260 followed by a secondary stroke 262 and a ringing time 264, which may also be referred to as a dead stroke or dead time. The ringing time 264 starts at the end of a secondary stroke 262 and ends at the start of the next primary stroke 260.

The primary stroke (which may also be referred to as a magnetization period, or on period) of the switching circuit can be considered as the period of time between the instant that the power switch is closed and the instant of maximum magnetization current in the inductor. Alternatively, the primary stroke may be considered as the period of time between the instant that the power switch is closed and the time at which the power switch is turned off. The schematic of FIG. 2 shows an interval between the end of the primary stroke and the start of the secondary stroke. This interval can be ignored it many practical applications as it is relatively short. Alternatively, in some examples the interval may be considered to be part of the primary stroke.

A secondary stroke (which may also be referred to as a demagnetization period, or off period) can be considered as the period of time that magnetic energy is flowing to the output of the flyback converter up until the magnetization current in the transformer falls to zero.

The top signal 251 in FIG. 2 is the voltage at the gate of a switching transistor. This gate signal 251 is high during the primary stroke (by definition). The gate signal 251 is low during all other periods of the switching cycle. When the gate signal 251 transitions from low to high, current starts flowing through the primary winding and the conduction channel of the switching transistor.

The primary current 252 is shown in the second graph of FIG. 2. After an initial surge in the primary current 252 due to discharging of the drain node of the primary switch, the primary current 252 ramps up linearly from a low level until it reaches a peak value, which is identified in FIG. 2 as Ipk-prim.

The third graph of FIG. 2 shows a curve 253 plotting the current through the output diode on the secondary winding side. It can be seen that this current 253 is zero during the primary stroke 260. At the end of the primary stroke 260, the energy stored in a magnetic field by the primary winding 206 starts to be transferred to the secondary winding. As the output current 253 rises from zero to a peak value, referred to as Ipk-sec, in the gap between the end of the primary stroke and the start of the secondary stroke the current delivered to the secondary winding (as measured through the output diode) decays from the peak value Ipk-sec to zero over the course of the secondary stroke 262.

The fourth graph of FIG. 2 shows the voltage at the drain of a switching transistor that is connected in series with the primary winding. This voltage will be referred to as Vdrain 254. When the gate signal 251 is high in the primary stroke 260, Vdrain 254 is close to zero.

When the gate signal 251 goes low, Vdrain 254 starts to rise. When Vdrain 254 crosses the converter input voltage (which is identified in FIG. 2 with reference 256), the secondary stroke 262 starts. More precisely, the secondary current starts to flow when Vdrain 254 reaches the converter input voltage 256+N×Vout, where Vout is representative of the desired output current, as the voltage across the secondary winding reaches Vout. The period of time during which Vdrain 254 rises from zero to the input voltage level represents the gap between the primary and secondary strokes 260, 262.

Vdrain 254 continues to rise at the beginning of the secondary stroke 262. Vdrain 254 reaches a peak value and then starts to oscillate with oscillations that gradually decrease in amplitude. The oscillations eventually decay to have negligible amplitude, and Vdrain 254 then has a relatively constant value up until the end of the secondary stroke 262. Immediately upon expiry of the secondary stroke 262, and up until the next primary stroke 260, a ringing time 264 occurs during which Vdrain 254 oscillates due to energy exchange between the parasitic capacitance at Vdrain and the magnetizing inductance of the transformer.

For a flyback converter, the average output current over one switching cycle is given by the formula:

$$Iout = \frac{Ipk}{2} * N * \frac{Tsec}{Tprim + Tsec + Tring}$$

Where:
  N is the turns ratio of the transformer,
  Iout is the output current,
  Ipk is the peak current in the primary winding,
  Tprim is the duration of the primary stroke, also referred to as the magnetization period,
  Tsec is the duration of the secondary stroke, also referred to as the demagnetization period, and
  Tring is the duration of the ringing period (the period between the end of the secondary stroke and the start of the next primary stroke).
The total period of the switching cycle (Tprim+Tsec+Tring) is equivalent to the choser switching period, Ts. Where the chosen switching frequency, $$Fs = \frac{1}{Ts}.$$

Figure 3:
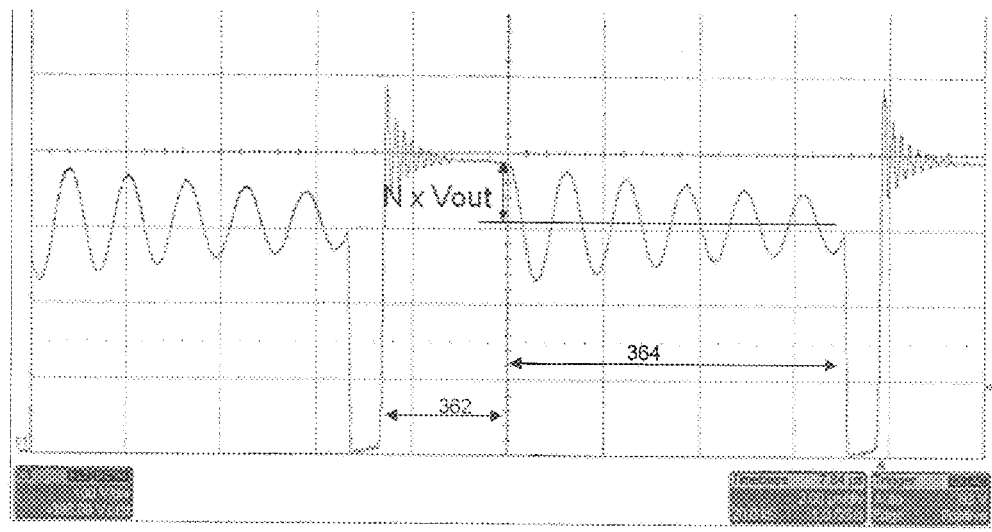
FIG. 3 shows further details of the voltage waveform at the drain of the power switch for the flyback converter of FIG. 1.

FIG. 3 shows further details of the voltage waveform at the drain of the power switch for the flyback converter of FIG. 1 operating in discontinuous conduction mode (DCM). The secondary stroke is shown with reference 362 and the ringing time is shown with reference 364. At the end of the secondary stroke 362, the voltage Vout across the secondary side of the transformer starts ringing with amplitude Vout, which also occurs at the primary side with amplitude N×Vout, where N is the turns ratio between the two windings.

If the flyback converter were operating in boundary conduction mode (BCM), then the voltage at the drain of the power switch would be similar to that shown in FIG. 3, but the ringing time 364 will be shorter as the next switching cycle is started shortly after the end of the actual switching cycle, preferably at the first valley of the ringing voltage, in order to reduce switching losses. In contrast, the next switching cycle is started later for DCM, giving an interval where no output current is delivered to the load (discontinuous output current).

Figure 4:
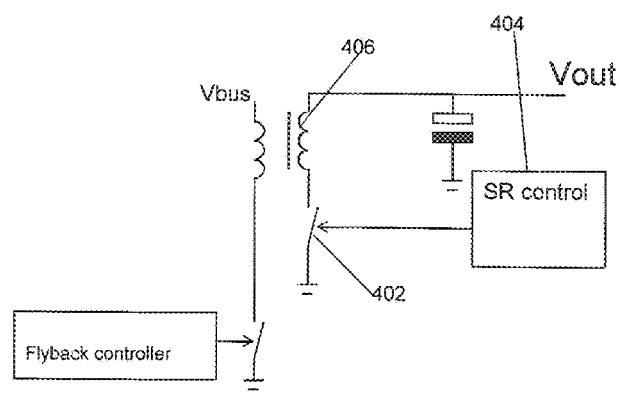
FIG. 4 illustrates part of a flyback converter in which synchronous rectification (SR) is used at the secondary side.

FIG. 4 illustrates part of a flyback converter in which synchronous rectification (SR) is used at the secondary side. A SR switch 402 provides the functionality of the diode shown in FIG. 1. The SR switch 402 is operated by a SR controller 404 in order to close the SR switch 402 when current flows through the secondary winding 406 in one direction and open the SR switch 402 when current flows through the secondary winding 406 in the opposite direction. In this way, the SR switch 402 is functionally the same as a diode. The SR switch can be a low ohmic switch that is controlled with accurate timing, which can allow a further increase in efficiency since the voltage drop across the SR switch 402 can be low compared to a diode.

The SR switch 402 of such flyback converters can be used for purposes in addition to rectification without significantly adding cost or complexity of design. For example a bidirectional flyback converter can be provided, in which the SR switch 402 is kept on for an additional interval after the end of the secondary stroke in order to build up energy in the transformer that can be used to discharge the drain node before the beginning of the next primary stroke. In this way "soft switching" can also be obtained for high mains, by switching on the power switch at a moment when the voltage at the switching node reaches a minimum, which is closer to 0 V then would otherwise be the case. This is possible due to the additional energy delivered back from the load to the transformer by keeping the SR switch on for a slightly extended time after the end of the secondary stroke. This can further increase efficiency and reduce electromagnetic interference (EMI) thereby providing a potential cost saving for the mains filter.

There can be a desire to communicate information between the windings of a transformer, particularly in a flyback converter, for many different reasons. Examples disclosed herein can relate to a general way of communication where a plurality of symbols, or bits, of information can be sent, without significant losses. The plurality of symbols together, rather than individually, may convey a discrete piece of information related to the detectable variable. The piece of information can be indicative of the detectable variable or indicative of a value that the controllable variable should take. The plurality of symbols can be considered to be a permutation or combination of separate symbols.

In some examples, communication may not be limited to intervals where the main converter is turned off, because especially at high power levels, such inactive intervals would require larger energy to be converted during other intervals, leading to undesired ripple voltages at the output and efficiency loss due to increased RMS currents. Another advantage to not limiting communication to such specific intervals is the very limited data transfer rate that may result.

Embodiments disclosed herein can enable communicated symbols to have more than one value, which can assist in sending serial data with the start and end of a dataword clearly identifiable.

Figure 5:
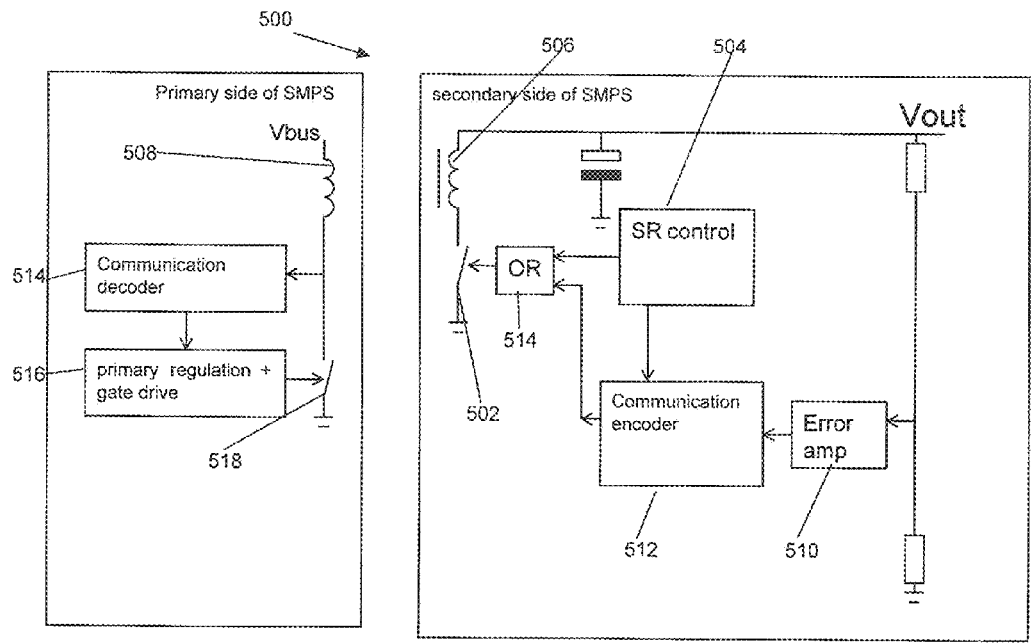
FIG. 5 illustrates a flyback converter in which the timing of an SR switch in relation to the end of the secondary stroke can be used to encode information for communication from the secondary side of the transformer to the primary side.

FIG. 5 illustrates a flyback converter 500 in which the timing of an SR switch 502 in relation to the end of the secondary stroke can be used to encode information for communication from the secondary side of the transformer to the primary side. The SR switch 502 is an example of a secondary side switch.

The flyback converter 500 includes a transformer having a first winding 506 and a second winding 508. In this example the second winding is a primary winding 508 and the first winding is a secondary winding 506. The secondary side of the flyback, converter 500 includes an SR switch 502 instead of a diode and a SR controller 504, that are similar to those described with reference to 3. In addition, the flyback converter 500 includes an error amplifier 510 that receives a signal representative of the output voltage Vout (in this example from a resistive divider across the output), and compares the output voltage with a target value. The measured output voltage is an example of a detectable variable at the first winding. Such error amplifiers 510 are well known in prior art examples where an error signal is communicated back to the primary side of the transformer via an optocoupler, such as in the example illustrated in FIG. 1.

The converter of FIG. 5 also includes a communication encoder 512. The communication encoder 512 receives the error signal from the error amplifier 510 and encodes the error signal into a switch control signal for operating the SR switch 502 in such a way that a voltage is added to the secondary winding 506 that is representative of error signal information to be communicated to the primary winding 508. The error signal could be an instruction to increase or decrease the output voltage, and optionally indicate the degree of change required. Adding a voltage to the secondary winding 506 in this way can be considered as generating a transformer relayed signal as the additional voltage will be reflected by the voltage across a winding at the primary side of the transformer, thereby having relayed a signal across the transformer. Various examples of how information can be encoded are provided below.

Optionally, the communication encoder 512 also receives a signal from the SR controller 504. As described below, this can be used to prevent the communication encoder from communicating information from the secondary side to the primary side of the transformer during the primary or secondary stroke of the flyback converter 500 in some examples.

The communication encoder 512 can receive timing information about the current state of operation of the flyback converter, for example primary stroke, secondary stroke, positive half of a ringing waveform in the ringing time, negative half of a ringing waveform in a ringing time, and how close a voltage during the ringing waveform is away from the top of bottom of the waveform. This timing information could be provided by the SR controller 504 or a logic state machine (not shown) that keeps track of the system timing, for example. The SR controller 504 can use the timing information to determine the time to the end of a secondary stroke (during which time the SR control block cases the SR switch 502 to be closed to provide rectification) or determine when the SR switch 502 should be turned on with respect of a certain moment before or after the top of a ringing oscillation. The implementation of such circuitry is straightforward to a person skilled in the art.

In this example, the flyback converter 500 also includes an OR gate 514. An output signal from the SR controller 504 is provided as an input to the OR gate 514, which causes the SR switch 502 (in the absence of any additional control signals) to operate as a diode, in the same way as described above. An output of the communication encoder 512 is also provided as an input to the OR gate 514 in order to close the SR switch 502 at intervals for communicating information. The OR gate 514 enables the SR switch 502 to be operated for both communicating information to the primary side and for normal operation of the flyback converter 500. It will be appreciated that in other examples the functionality of the OR gate 514 could be incorporated into the communication encoder 512 such that only the communication encoder 512 needs to provide a control signal to the SR switch 502.

One or more of the error amplifier 510, communication encoder 512, SR controller 504, OR gate 514 and secondary winding 506 may be considered together as a transmitter that detects a detectable variable at the first winding, generates a transformer relayed signal in accordance with the detectable variable, and provides the transformer relayed signal to the first winding.

A communication decoder 514 and flyback controller 516 are provided at the primary side of the flyback converter 500. The flyback controller 516 in this example can be referred to as a primary regulation and gate drive controller 516.

The communication decoder 514 can monitor the voltage across (or another signal associated with) the primary winding 508 in order to identify any information that has been communicated from the secondary winding 506 through operation of the SR switch 502. As one example, the voltage at the drain node of the power switch or the voltage across an auxiliary winding at the primary side can be monitored. The communication decoder 514 can use similar timing information to that used to encode the information by the communication encoder 512 at the secondary side. However, due to the mains isolation between the primary and secondary sides, this timing information may need to be generated independently at the primary side.

Having decoded any communicated information, the communication decoder 514 provides a control signal to the flyback controller 516 in order to set or adjust operation of the power switch 518 in accordance with the information that has been received from the secondary side. One or more operational parameters of the power switch can be controllable variables at the primary side of the flyback converter 500. For example, if the communicated information indicates that the output voltage is too low, then the flyback controller 516 can control the power switch 518 in such a way that the output voltage is increased. As known in the art, this can involve adjusting the switching frequency of the power switch or adjusting the peak current at the primary side.

One or more of the primary winding 508, communication decoder 514, flyback controller 516 and power switch 518 may be considered together as a receiver that receives the transformer relayed signal from the second winding and controls a controllable variable at the second winding in response to the transformer relayed signal.

It will be appreciated that embodiments disclosed herein can be used with flyback converters that do not include an SR switch at the secondary side. For example, the flyback converter shown in FIG. 1 (which includes a diode instead of an SR switch) can be adapted by adding a communication switch (which may be a small switch) in parallel with the diode for communication purposes. That is, the diode can be bypassed by closing the communication switch when it is required to add a voltage to the secondary winding for communication purposes. Such a communication switch can be a cheaper and less robust switch than an SR switch, as only small current pulses may need to pass through the switch. Also, the driving losses of such a switch may be smaller than using SR, which is advantageous. It will be appreciated that the OR gate shown in FIG. 5 may not be required for such embodiments.

As a further alternative, an SR switch can be used only for rectification and a separate communication switch in parallel with the SR switch can be used specifically for communication. The SR switch and the communication switch are examples of secondary side switches. A communication switch may have a higher ohmic property than a SR switch. Any of the communication switches disclosed herein could be integrated into a secondary side controller integrated circuit (IC).

Figure 6:
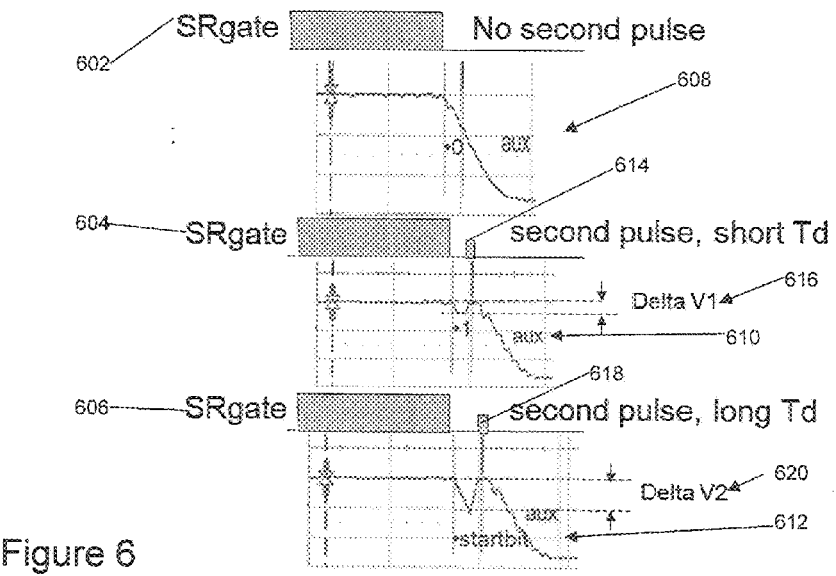
FIG. 6 illustrates an example of how information can be encoded into the voltage across a secondary winding.

FIG. 6 illustrates an example of how information can be encoded into the voltage across a secondary winding during the ringing time of a flyback converter in order to communicate between windings of the flyback transformer. The flyback converter in this example has SR rectification at the secondary side.

FIG. 6 shows three timing diagrams. Each timing diagram includes a signal 602, 604, 606 representative of the state of the SR switch (SRGate) and a signal 608, 610, 612 representative of the voltage at an auxiliary winding of the flyback converter (Vaux). It will be appreciated that the shape of the voltage on the auxiliary winding will be the same as the shape of the voltages on the primary and secondary windings.

As shown by SRGate 602, 604, 606 in each of the three timing diagrams, the SR switch is turned off at the end of the end of the secondary stroke in order to rectify the output signal. The result is that Vaux 608, 610, 612 (and hence also the output voltage across the secondary winding) starts ringing as discussed above with reference to FIGS. 2 and 3. Only a short portion of the ringing waveform is shown in FIG. 6 where the ringing waveform starts at its initial value and drops to near the bottom of an oscillation.

The top timing diagram in FIG. 6 shows an example when no second SR pulse is generated. That is, the flyback converter is working normally and the SR switch is used only for rectification. In this case, the voltage ringing will be the same as that shown in FIG. 3.

The middle timing diagram shows the situation where a SR pulse 614 is provided by briefly closing the SR switch shortly after the voltage ringing has started. When the SR switch is closed during the voltage ringing, a voltage Vout is connected across the secondary winding, which results in a voltage step of Delta V1 616 in Vaux 610. The time between the start of the ringing (the end of the secondary stroke) and the start of the SR pulse 614 will be referred to as the SR pulse delay time.

The voltage step Delta V1 616 is detectable at the primary side of the transformer, for example by monitoring the voltage at node Vdrain or across an auxiliary winding as shown in FIG. 6.

Delta V1 616 is significantly smaller than Vout, while the energy lost due to ham switching (switching losses) is proportional to DeltaV$^2$. Embodiments of the present invention allow any kind of information to be sent from the secondary side to the primary side. For example, an error signal indicative of a difference between a desired output voltage and the actual output voltage (the detectable variable). That is, a transformer relayed signal (error signal) can be set in accordance with the detectable variable. The error signal can be processed at the primary side to set a controllable variable for the converter that sets the power level in accordance with the detectable variable. In this way the controllable variable can be set to a desired combination of converted energy per cycle (=0.5×Ipeak$^2$×Ltrafo) and switching frequency in order to provide improved efficiency power conversion for the desired output voltage. As such, embodiments of the invention may allow for improved performance flexibility. Such flexibility is particularly useful in order to improve efficiency and operation above the audible limit of 20 kHz, during normal operation. When using a burst mode, it may also be necessary to adapt the energy per cycle in order to provide a desired efficiency and the occurring burst repetition time within desired limits.

The bottom timing diagram shows the situation where a SR pulse 618 is provided shortly after the voltage ringing has started, but later than the SR pulse 614 in the middle timing diagram. That is, the SR pulse delay time is longer for the bottom timing diagram than the middle timing diagram. Therefore a larger part of the voltage ringing has already occurred when the SR pulse 618 takes place, which leads to a different size of voltage step in Vaux 612. In the bottom timing diagram a voltage step of DeltaV2 620 is generated.

It will be appreciated that that the SR pulse delay time is related to the amplitude of the voltage step DeltaV 616, 620. Therefore it is possible to use either the SR pulse delay time or the amplitude of the voltage step DeltaV to define a property of the pulse, such as the start time relative to the phase of the ringing oscillation. Encoding information into the voltage across the transformer in this way can enable symbols with two or more discrete levels to be used. Binary values can be encoded though the presence or absence of a second SR pulse. More than two discrete levels can be encoded by modulating the amplitude of the voltage step DeltaV or the length of the SR pulse delay time.

In other examples the length of time that the SR switch is closed can be used to provide the pulse representative of information to be communicated across the transformer.

The above options for encoding information can be combined to encode a stream of digital information into successive switching cycles of the flyback converter if required.

Figure 7:
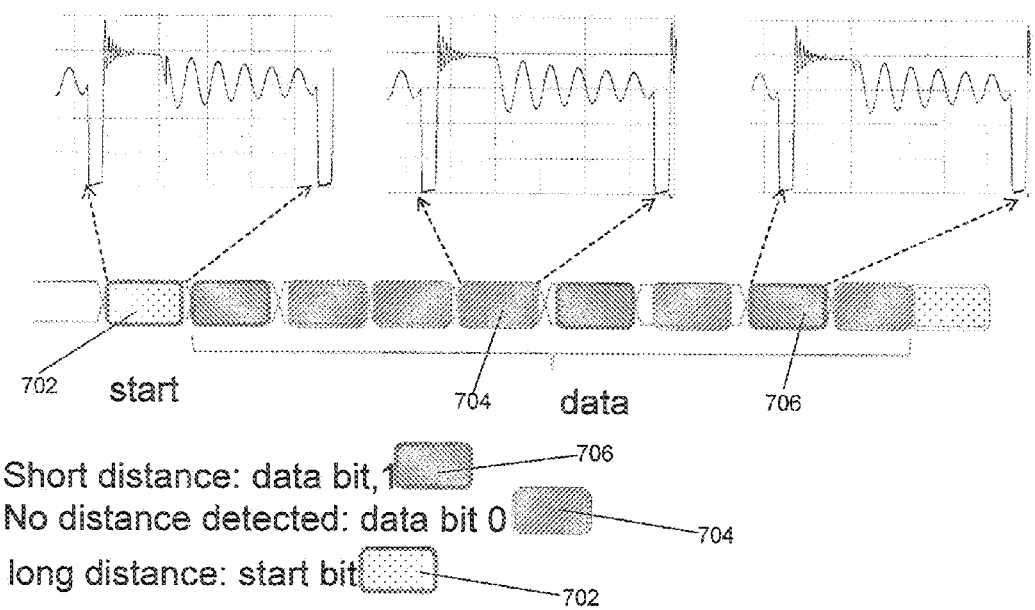
FIG. 7 illustrates an example of encoding information onto a ringing time portion of a voltage waveform.

FIG. 7 illustrates an example of encoding information onto a ringing time portion of a voltage waveform, which enables discrimination between a startbit 702 and an information bit. In this example, a startbit 702 is encoded by a step voltage deltaV1 of a pre-determined amplitude. A stopbit can be encoded in the same or a different way. An information bit with a value of 1 706 is encoded by a step voltage deltaV2 of a predetermined amplitude, which is different to deltaV1. In this example, deltaV1 is greater than deltaV2. An information bit with a value of 0 704 is encoded by encoding no step voltage at all. If no step voltage is identified for a ringing oscillation between a startbit 702 and a stopbit then it may be interpreted as an information bit with a value of 0 704. A startbit 702, stopbit, 0 704 and 1 706 are all examples of symbols.

FIG. 7 is an example where a startbit 702 can be discriminated from an information bit with a different deltaV, while an information bit with a value of 1 706 and 0 704 are distinguishable by the presence or absence of a second SR pulse.

Figure 8:
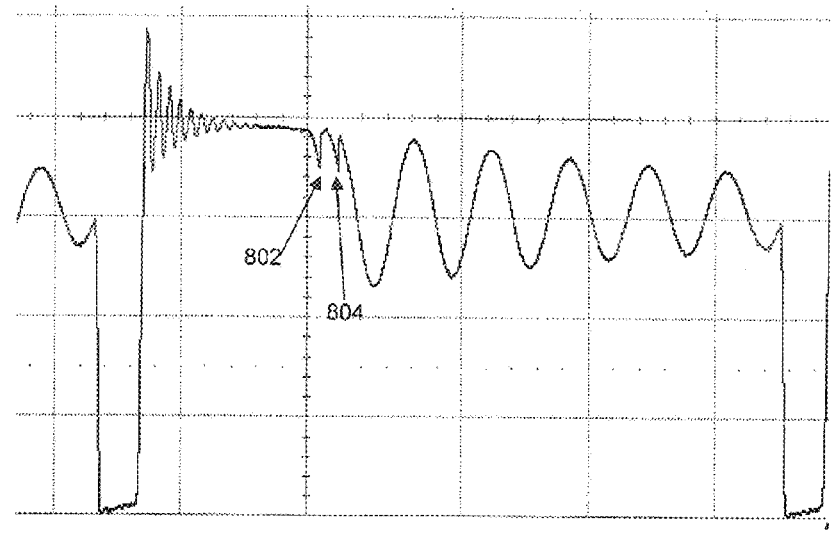
FIG. 8 illustrates another example of encoding information onto a ringing time portion of a voltage waveform across a winding of a flyback transformer.

FIG. 8 illustrates another example of encoding information onto a ringing time portion of a voltage waveform across a winding of a flyback transformer. In this example, instead of one pulse being used per switching cycle or ringing oscillation, a plurality of pulses one after each other in the same ringing oscillation can be used. The identification of a plurality of pulses, or the distance/time between two pulses, or the resulting step voltage deltaV, can define the value of each bit or symbol.

FIG. 8 shows two pulses in quick succession shortly after the end of the secondary stroke. This is visible as two notches 802, 804 at the start of the ringing waveform.

As shown in FIG. 8, using a plurality of pulses provides more energy into the transformer due to the fact that the output voltage is coupled to the secondary winding for a longer time. The number of pulses that can be applied directly after each other may limited due to the finite period of time available in each ringing oscillation.

Although not visible in FIG. 7 or 8, the application of the step voltage can lead to a larger amplitude of the voltage ringing after the pulses have been applied.

Figure 9:
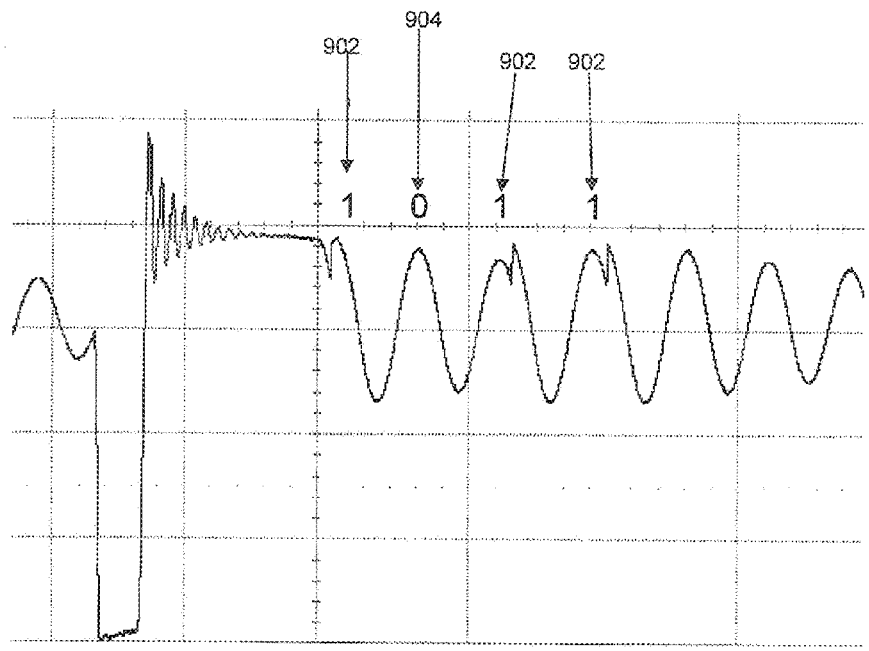
FIG. 9 illustrates another example of encoding information onto a ringing time portion of a voltage waveform.

FIG. 9 illustrates another example of encoding information onto a ringing time portion of a voltage waveform. In this example several pulses are applied to separate instances of the ringing oscillation within one switching cycle of the flyback converter.

In FIG. 9, an information bit with a value of 1 or 0 is defined by the presence or absence of a second SR pulse. A 1 is represented by the presence of a second SR pulse 902 and a 0 is represented by the absence of a second SR pulse 904. In addition, it will be appreciated that it is possible to define more levels by using different voltage step deltaV values to define start and stop pulses as discussed above.

In some examples, the pulses can be applied at or close to a maximum or minimum of the ringing oscillation in order to reduce switching losses.

This embodiment can enable a good bit rate for the communication to be achieved, even if the switching frequency of the flyback converter is low, which may occur in low load situations.

Figure 10:
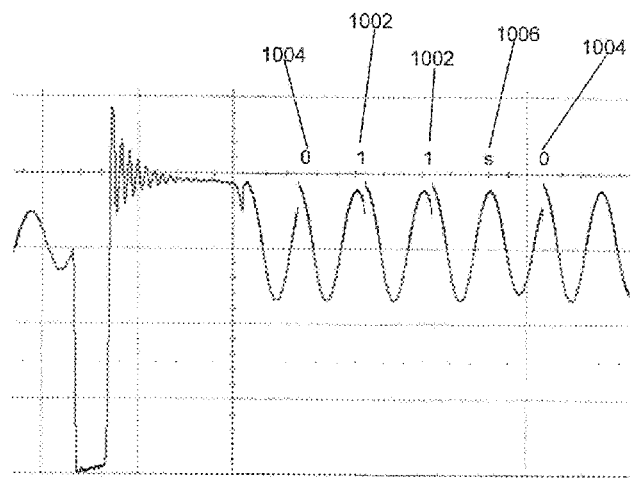
FIG. 10 illustrates another example of encoding information onto a ringing time portion of a voltage waveform.

FIG. 10 illustrates another example of encoding information onto a ringing time portion of a voltage waveform. In this example the timing of the SR pulse in relation to a predetermined point in the ringing oscillation is used to encode data. Such a predetermined point can be a predetermined phase angle, a predetermined time in the oscillation or a pre-determined amplitude in the oscillation. In the example of FIG. 10, the SR pulse is timed relative to a peak in the ringing oscillation. Applying the SR pulse just before or after the top of the ringing can encode a 1 or a 0 in such a way that it can be decoded at the primary side. A 1 is encoded in FIG. 10 with a pulse shortly after the peak of the ringing oscillation, as shown with reference 1002. A 0 is encoded in FIG. 10 with a pulse shortly before the peak of the ringing oscillation, as shown with reference 1004. Also, a third value can be attributed to a ringing oscillation. In this example a startbit or stopbit is encoded by the absence of a pulse around the peak of the ringing oscillation, as shown with reference 1006.

Figure 11A:
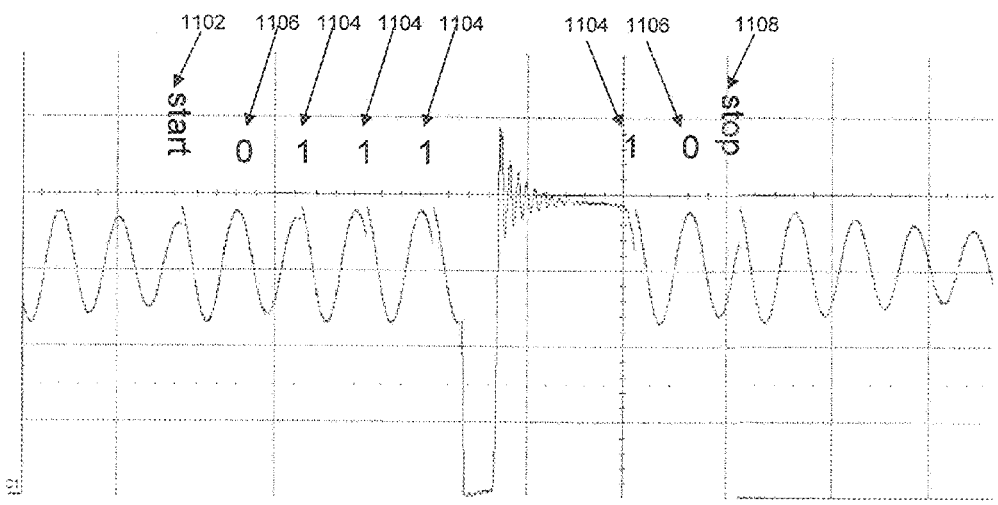
FIG. 11a illustrates another example of encoding information onto a ringing time portion of a voltage waveform.

FIG. 11a illustrates another example of encoding information onto a ringing time portion of a voltage waveform. In this example communication of information can be started at any arbitrary moment in the ringing time, and optionally the communication cart span more than one flyback switching cycle. The start of communication need not be restricted to the end of the secondary stroke.

The embodiment of FIG. 11a can enable a fast response time, for example when a new power level setting has to be communicated to the primary side. In FIG. 11a, the means for communicating information using the natural ringing according FIG. 10 is combined with using the end of the secondary stroke to communicate information too.

In this embodiment, the sequence starts with a first SR pulse that represents a startbit 1102 that occurs before a peak partway through a ringing time of a first flyback switching cycle. In other examples, the identification of any SR pulse in the ringing, irrespective of its relative timing or amplitude may be construed as a startbit. The following 6 peaks in the ringing time are used to encode 1s and 0s. In this example a 1 1104 is encoded by a SR pulse close to a peak or a SR pulse just after the end of the secondary stroke. A 0 1106 is encoded by the absence of a SR pulse close to a peak in the ringing oscillation or after the end of a secondary stroke. A stopbit is encoded by a SR pulse 1108 significantly before the peak of a ringing oscillation. Alternatively or additionally, a stopbit can be encoded by two SR pulses close together after the end of the secondary stroke (not shown).

In this way it is possible to start the communication of a dataword at any arbitrary moment in the ringing time. Individual bits can be sent depending on what options are available as determined by the primary side switching sequence.

If the primary/power switch uses valley-switching (that is switching at a time when the voltage across the switch is a minimum/valley) to start a next cycle, and the SR switch is only turned on for communication around the tops of the ringing, it is guaranteed that both switches will not be turned on at the same moment which is advantageous because this would result in a very rapid current rise in both the primary switch and the SR switch as the transformer leakage inductance is in between two voltage sources: the primary supply voltage and −N×Vout. This could lead to the destruction of the switches if one of them is not turned off very rapidly.

Figure 11B:
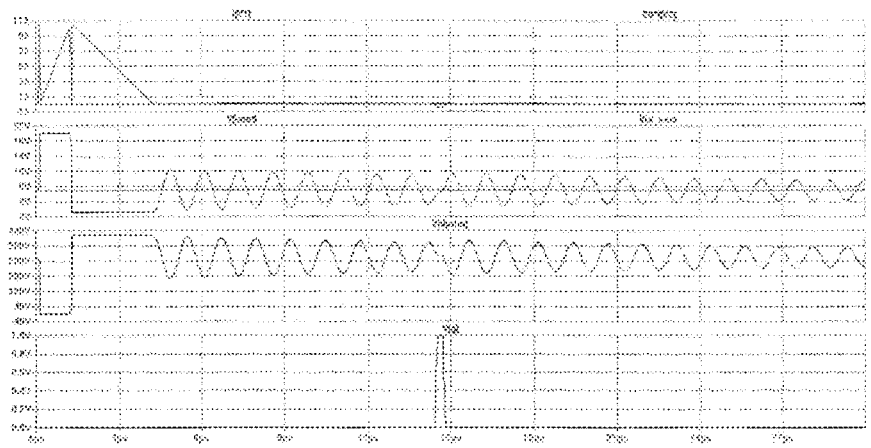
FIG. 11b illustrates another example of encoding information onto a ringing time portion of a voltage waveform.

FIG. 11b illustrates another example of how information can be encoded into the voltage across a secondary winding during the ringing time of a flyback converter in order to communicate between windings of the flyback transformer. In this example, a more highohmic (for example 10 ohm) communication switch can be used at the secondary side. Due to the highohmic switch it may not be possible to make the steep deltaV as shown in FIGS. 8 to 11. However, a detectable deviation from the default ringing shape can occur, as shown in FIG. 11b, which can be detected on the other side of the transformer. One or more embodiments disclosed herein can detect any change in a characteristic of the expected ringing, including the shape of the ringing.

It will be appreciated that any reference to "close to", "before, "shortly before", "after" or "shortly after" etc, can refer to the parameter in question being less than or greater than a threshold value, or between two threshold values, depending upon the context.

A special situation can occur when the flyback switching frequency as set by the primary side is extremely low, for example at low load, as the amplitude of the ringing can be completely damped before the start of the next primary stroke. In this case it can still be possible to start a communication sequence by closing the SR switch if the encoding and decoding does not needed to be synchronized with the ringing. In one example, such a means of encoding and decoding can be used if the amplitude of the ringing is below a certain threshold. Such encoding and decoding may be independent of any timing information associated with the ringing time and/or the flyback switching cycle. Therefore, advantageously, embodiments disclosed herein can communicate via the transformer windings even if there is no ringing or ringing with only a small amplitude.

Embodiments disclosed herein can be configured to account for the possibility that a communication sequence is started at the same moment as the next switching cycle is started at the primary side. The SR switch can be driven by very short pulses and with a gate voltage that is just above the threshold voltage of the SR switch, in which case this situation will not be harmful because, due to the low gate voltage, the current that can be delivered by the SR switch is rather limited. Operation of the SR switch may therefore be allowed for a certain time without the risk of damaging the switches, while use of the short gate pulses further limit the duration of the undesired interval. This situation with start of communication and primary side switch turn on can be detected by the secondary side as the voltage across the SR switch directly after this event will be Vout+Vin/N, where Vin/N is the voltage generated across the secondary side winding by the primary side switch being in the conducting state. As the secondary winding is connected to Vout, the voltage at the SR switch drain on off state will be Vout+Vin/N, The action could be to resend the first bit at the first applicable moment, being the end of the next secondary stroke as the secondary side tried to communicate at primary switch turn on, the communication failed, but it is still possible to resend the last command at the earliest moment available. This is the end of the next secondary stroke.

It will be appreciated that the above encoding examples are not exhaustive. Also, one or more of the encoding examples disclosed herein can be combined to communicate additional information across the transformer.

As discussed above, embodiments disclosed herein can use a SR switch or small additional switch to communicate information by switching it completely on, or at least making it lowohmic. Other embodiments can drive the switch differently, for example by giving it a current source behaviour. Such an example is discussed with reference to FIG. 12.

Figure 12:
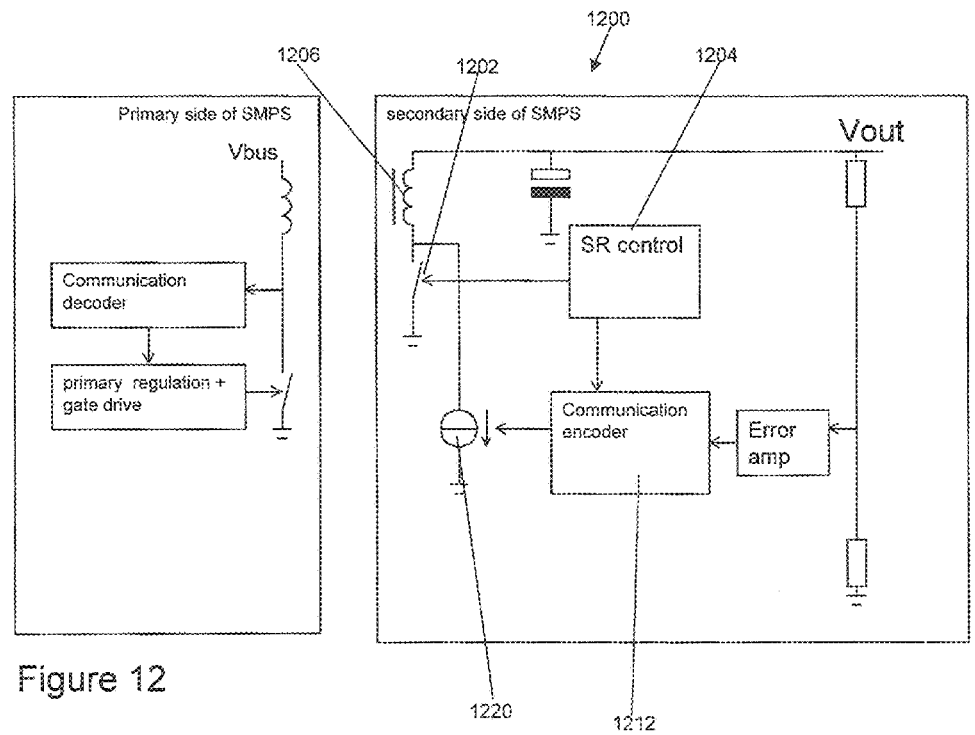
FIG. 12 illustrates a flyback converter that uses a current source 220 to communicate information from the secondary side to the primary side of the transformer.

FIG. 12 illustrates a flyback converter 1200 that uses a current source 1220 to communicate information from the secondary side to the primary side of the transformer. The flyback converter 1200 of FIG. 12 is similar to the flyback converter of FIG. 5.

Components that are common to both FIG. 12 and FIG. 5 will not necessarily be described in detail again here.

In FIG. 12, the SR controller 1204 is used to operate the SR switch 1202 as a rectifier. The SR controller 1204 also provides a signal to the communication encoder 1212, for example to prevent information from being communicated during the primary and/or secondary strokes.

In this example, a current source 1220 is provided in parallel with the SR switch 1202. The communication encoder 1212 provides a control signal to the current source 1220 in accordance with a detectable variable at the secondary side. The current source 1220 provides a pulse of additional current through the secondary winding 1206 in accordance with the control signal, thereby dropping an additional voltage across the secondary winding 1206 in a similar way to the examples described above. In this way, information can be communicated to the primary side of the flyback converter.

The current source 1220 receives energy equal to V×I×deltaT, where V is the voltage across the current source and deltaT is the duration of the pulse. The secondary winding receives an energy equal to V1×I×deltaT, where V1 is the voltage across the secondary winding. The output Vout delivers an energy Vout×I×deltaT where Vout=V+V1. Vout can deliver or draw energy to or from both the transformer winding and the current source. The sign of the energy transfer depends on the voltage across a component and the current direction during the interval deltaT.

The basic equation for the energy, W, provided by the current source 1220 is:

$$W = I \times V1 \times \text{delta}T$$

where:
 I is the value of the current;
 deltaT is the duration of the pulse (the length of time that the communication encoder 1212 causes the current source 1220 to provide a current to the secondary winding 1206); and
 V1 is the momentary value of the voltage across the secondary winding 1206 during the pulse of additional current.

Since V1 changes between positive and negative values, energy can be either delivered to or removed from the winding, depending on the sign of V1.

When the current source 1220 is turned on for a short interval around a valley (minimum/bottom) in the ringing period at the secondary drain, the current source can add a specific energy to the resonating voltage at the drain of the power switch on the primary side. This is shown graphically in FIG. 13.

Alternatively, when current source 1220 is turned on for a short interval around a peak (maximum/top) in the ringing period at the secondary drain, the current source 1220 can remove a specific energy from the resonating voltage at the drain of the power switch on the primary side. This is also shown graphically in FIG. 13.

In some examples, an inverter and a decoupling capacitor can be used instead of, or as part of, the current source 1220.

Figure 13:
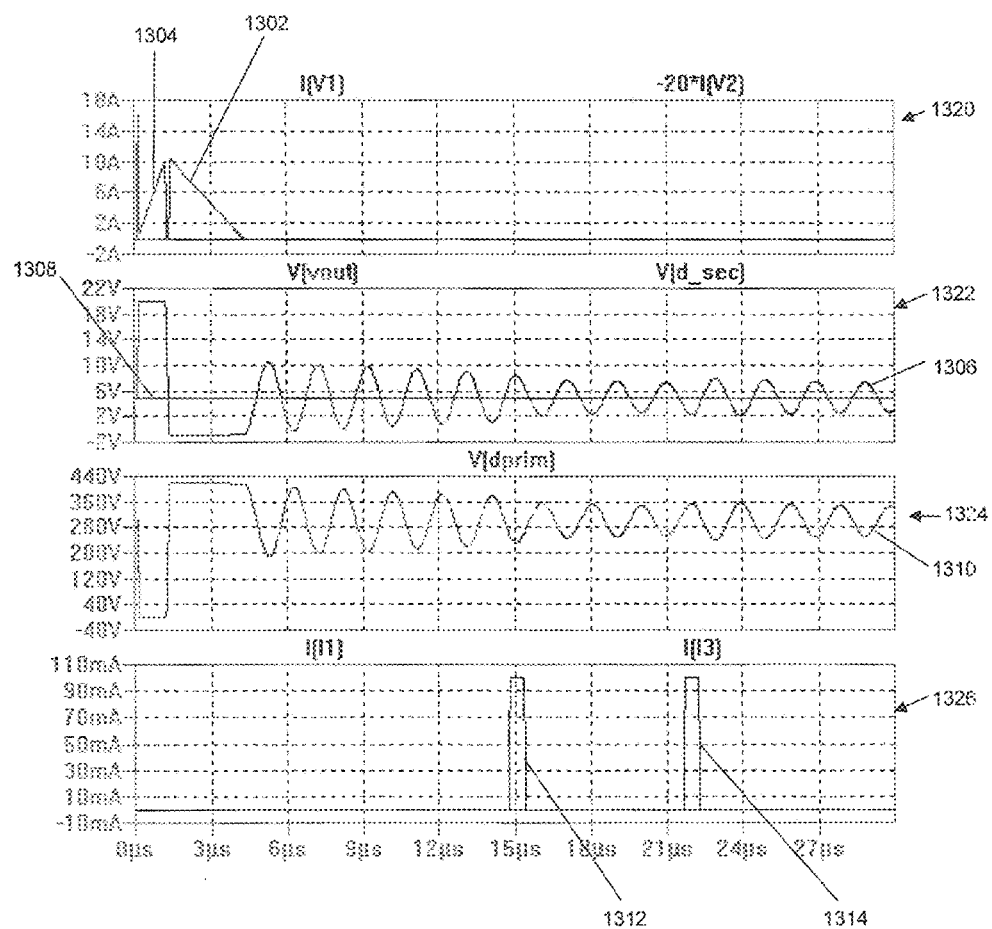
FIG. 13 shows plots that illustrate operation of the flyback converter of FIG. 12.

FIG. 13 shows various plots that illustrate operation of the flyback converter of FIG. 12. The horizontal axis of each plot represents time. The simulation was performed with a magnetizing inductance of 650 uH, a parasitic capacitance (which causes the ringing) of 150 pF, and a 50 ohm Rseries to get a practical damping of the ringing.

The top plot 1320 shows the current (I(V1)) in the load 1302 (for 5 V output) and the primary current (I(V2)) 1304. The value of the primary current has been scaled by the transformer turns ratio (20 in this example) so that the two waveforms 1302, 1304 have an equal amplitude.

The second plot 1322 shows the output voltage (V(vout)) 1308 and the voltage at the drain of the secondary switch (V(dsec)) 1306.

The third plot 1324 shows the voltage at the drain of the primary switch (V(dprim)) 1310 It can be seen that the shape of V(dprim) 1310 is inverted relative to the shape of V(dsec) 1306.

The fourth plot 1326 shows two additional current pulses I1 and I3 provided by the current source between the secondary drain and ground.

A first current pulse I1 1312 is provided at an instant in time that corresponds with a peak in V(dsec) 1306 (which occurs at a valley in V(dprim) 1310). It can be seen that the amplitude of the ringing in both V(dsec) 1306 and V(dprim) 1310 decreases after the pulse of additional current 1312.

A second current pulse I2 1314 is provided at an instant in time that corresponds with a valley in V(dsec) 1306 (which occurs at a peak in V(dprim) 1310). It can be seen that the amplitude of the ringing in both V(dsec) 1306 and V(dprim) 1310 increases after the pulse of additional current 1314.

In some examples it can be advantageous to provide the pulse of energy to the secondary winding at a top or bottom of the ringing as this can reduce switching losses. In other examples however, larger switching losses can be acceptable in favour of a more easily detectable pulse at the primary side. The specific instant or instants in the ringing oscillation that is or are used for communicating information across the transformer can be selected in accordance with the requirements of a particular application.

Although the examples disclosed above mainly relate to communicating information from the secondary side of the flyback converter to the primary side, the examples can equally apply to communicating information from the primary side to the secondary side. This is possible due to the symmetry between the flyback converter's secondary side with a SR switch and the primary side with a main/power switch.

One embodiment for sending information from the primary side to the secondary side of a switched mode power supply such as a flyback converter involves representing the information to be communicated by changes in the amplitude of a ringing/resonance waveform between the magnetizing inductance of the transformer and the capacitance at the drain node of the power switch (Vdrain). A similar example is described above with reference to FIG. 12.

Such an embodiment can be applied to bidirectional flyback converters, for example. In a flyback converter with bidirectional action, switch rectification (SR) can be used at the secondary side to provide rectification, as discussed above. Such SR includes a SR switch and SR controller to detect and control the secondary stroke interval. The SR switch is put into a conducting state by the SR controller during the secondary stroke, while current flows to the load.

The SR switch can be also kept on for an additional interval, beyond the end of the secondary stroke, to provide bidirectional action in boundary conduction mode (BCM) During this additional interval, the current in the secondary side of the transformer reverses and energy is delivered back from the load to the secondary winding of the transformer. After this additional interval, the SR switch is turned off. The additional energy that has been stored in the transformer discharges the primary switching node and allows for soft switching (switching when there is a low or zero voltage across the switch) of the primary/power switch. This soft switching can reduce or eliminate switching losses and can strongly reduce EMI. Such a reduction in EMI can lead to a requirement for a smaller EMI filter with potentially smaller losses in the EMI filter. This in turn, can improve the efficiency of the converter.

In addition to BCM, a bidirectional flyback converter can also be operated in discontinuous conduction mode (DCM) in order to keep the switching frequency below a desired maximum and to get a better compromise between root mean square (RMS) losses and switching losses, and therefore better efficiency for some applications. At DCM, a waiting interval is included after the end of the secondary stroke, before the next primary stroke is started. The advantages of bidirectional flyback converters can also be applicable for operation in DCM.

A need has been identified for the primary side controller to communicate with the secondary side. For bidirectional flyback converters, for example, a bidirectional flyback, stroke should be started at the secondary side by closing the SR switch before the primary stroke is started by closing the power switch at the primary side. One or more embodiments disclosed herein enable information to be communicated from the primary side to the secondary side such that the SR switch can be operated by a controller at the primary side (with information relating to when the power switch will be operated to start the secondary stroke).

Advantageously, this information can be communicated via the transformer windings whilst maintaining mains isolation, thereby avoiding use of an opto-coupler or pulse-transformer (pulsetrafo) for example. Use of an optocoupler or pulse-transformer (pulsetrafo) to send this information has a negative implication in terms of consumed power, as well as cost and number of components. One or more of the embodiments disclosed herein can communicate this information from the primary side to the secondary side.

As will be appreciated from FIGS. 1 to 3 and as known in the art, the energy available for the ringing is related to the voltage N×Vout at the end of the secondary stroke across a parallel resonant circuit formed by Cpar and Lm. Cpar is the total capacitance at the primary switching node and Lm is the magnetizing inductance of the transformer The ringing is both present in the voltage domain and the current domain, however in the voltage domain, the amplitude of the ringing is limited to (clipped at) a maximum value equal to N×Vout, while in the current domain, the amplitude of the ringing is not clamped (although it may be distorted due to the voltage clamp action).

Figure 14:
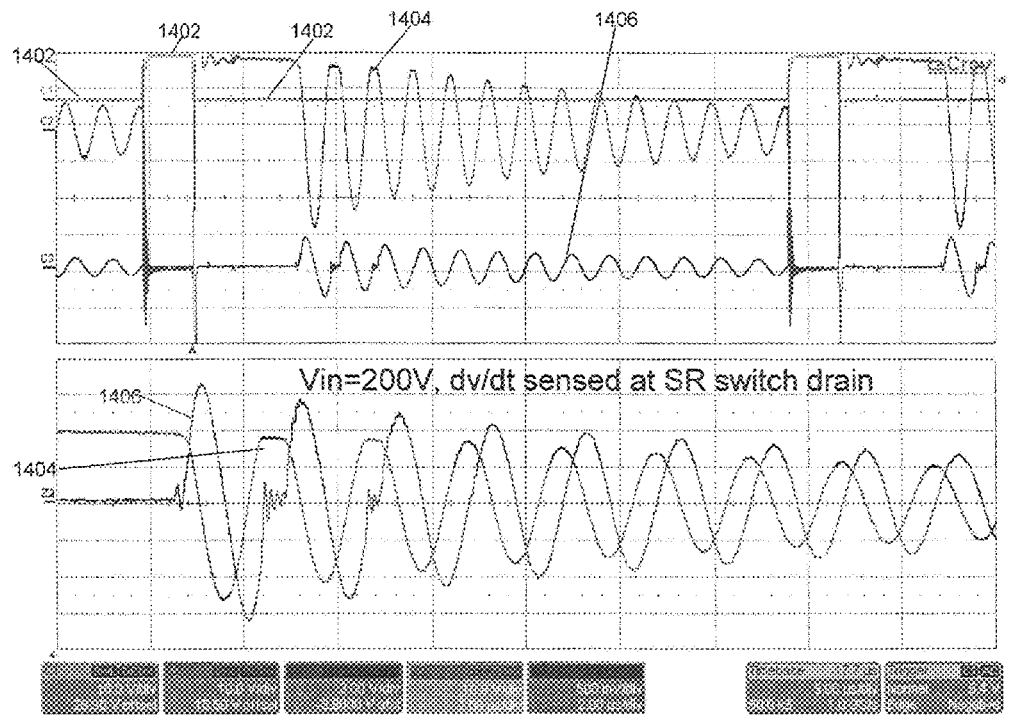
FIG. 14 shows two plots that illustrate operation of a flyback converter, which show ringing in both the voltage domain and current domain.

FIG. 14 shows two plots that illustrate operation of a flyback converter, which show ringing in both the voltage domain and current domain. The top plot includes three waveforms:

A first waveform 1402 illustrates the drive voltage for the power switch at the primary side of the flyback converter.

A second waveform 1404 illustrates the voltage across an auxiliary winding of the transformer.

A third waveform 1406 illustrates the derivative of the voltage at the drain of the SR switch. During the ringing this derivative is proportional to the current in the parasitic capacitance at the drain node (I=Cpar×dVdrain/dt). Therefore, this derivative represents the ringing in the current domain.

The second waveform 1404 and third waveform 1406 are shown in greater detail in the bottom plot of FIG. 14, and are also overlaid with each other so that they can be more easily compared.

Normally the amplitude of the ringing decreases with an exponential shape as the energy is dissipated by losses in resistive elements. It is therefore possible to detect any change of energy outside the expected range due to normal damping and use this detected change to determine a moment in time. That is, an increase or decrease in the amplitude of the ringing (compared with an expected value, which may take into account any damping of the ringing) can be identified as information that has been communicated across the transformer.

A flyback converter disclosed herein can communicate a bit of information by adding or subtracting energy to or from the primary winding of the flyback transformer thereby changing a property of the ringing that can be detected at the secondary winding. The property of the ringing may be amplitude. Alternatively, an instant in time can be communicated by the addition or subtraction of energy.

Figure 15:
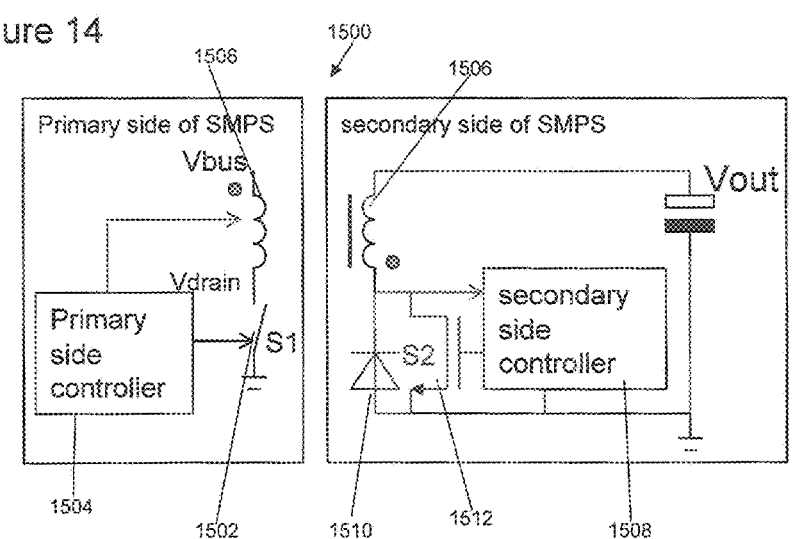
FIG. 15 illustrates a flyback converter in which information representative of an instant in time is communicated from the primary winding to the secondary winding.

FIG. 15 illustrates a flyback converter 1500 in which information representative of an instant in time is communicated from the primary winding 1508 to the secondary winding 1506.

A power switch 1502 is connected in series with the primary winding 1508. The power switch 1502 is controlled by a primary side/flyback controller 1504.

A diode 1510 is connected in series with the secondary winding 1506. The diode 1510 allows the secondary winding to be connected to Vout during the secondary stroke. A secondary side switch 1512 is provided in parallel with the diode 1510. The secondary side switch 1512 is controlled by a secondary side controller 1508.

The flyback controller 1504 controls the power switch 1502 in accordance with normal operation to close the power switch during the primary stroke of operation. Also, the flyback controller 1504 controls the power switch 1502 to close it during the ringing in time between the end of a secondary stroke and a start of the next primary stroke in order to communicate information from the primary side to the secondary side via the transformer. The communicated information can be a moment in time at which the secondary side switch 1512 at the secondary side should be closed to start a bidirectional flyback stroke. The communicated information is detected by the secondary side controller 1508 by sensing the voltage or derivative of the voltage across the secondary winding 1506 or an auxiliary winding at the secondary side of the transformer.

Figure 16:
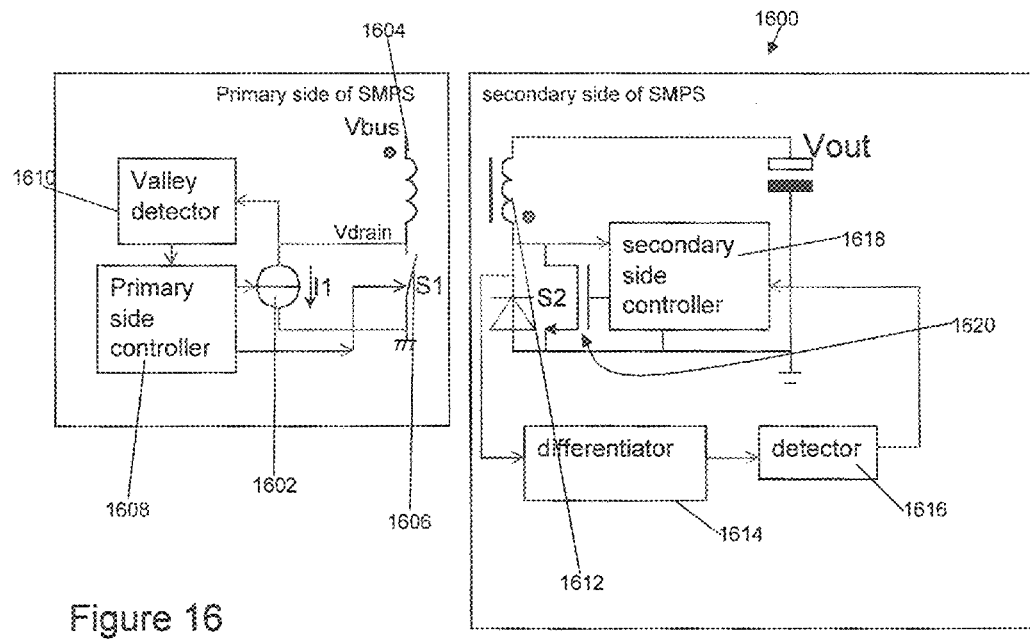
FIG. 16 shows another example of a flyback converter.

FIG. 16 shows another example of a flyback converter 1600. Features of FIG. 16 that have already been described above will not necessarily be described again here.

The flyback converter 1600 of FIG. 16 includes a small transistor 1602 in parallel with the power switch 1606, which can be driven as a constant current source (I1) 1602 to deliver a current, such as a few milliamps, to the primary winding 1604. This small transistor will be referred to as a communication current source 1602. A primary side controller 1608 operates the communication current source 1602 in order to put energy into the transformer during the ringing time of operation, in a similar way to that described above with reference to FIG. 13.

In this example, an optional valley detector 1610 is also provided at the primary side. The valley detector 1610 identifies valleys in the ringing time of the voltage across the primary winding 1604 and provides a signal to the primary side controller 1608 to this effect. In this way, the primary side controller can control the communication current source 1602 to generate a current pulse at a valley of the ringing in order to inject the proper polarity of the delivered current. The ringing current across the secondary winding 1612 is sensed by a differentiator 1614, which provides an output signal to a detector 1616 for detecting the amplitude change. The detector 1616 provides an output signal to a secondary side controller 1618 when a change in the amplitude of the ringing that is representative of communicated information is detected by the secondary side controller 1618. The communicated information is indicative of a request to operate the SR switch 1620 and start the bidirectional flyback stroke. Optionally, the secondary side controller 1618 may be configured to close the secondary side switch 1620 at the next valley of the voltage at the drain of the secondary side switch 1620 in order to reduce switching losses. That is, switching losses related to the closure of the power switch 1606 are reduced.

In this embodiment, only a small part of the energy is stored in the ringing resonance, as determined by the voltage at the drain of the power switch 1606 (Vdrain) in relation to the voltage across the winding. In one example, Vdrain is 220V, while the voltage across the winding is 100V. This means that only 31% of the energy is used to increase the energy of the ringing, while the rest is dissipated. A minimum step change in amplitude may be required for detection, whilst the energy lost should be small compared to the energy converted in order to maintain adequate efficiency. It will be appreciated that it is desirable for the energy from the current pulse to be delivered as efficiently as possible.

In another example, the current source 1602 could be configured to provide an AC component with a carrier frequency. The primary side controller 1608 in this example is configured to add an additional signal to the carrier frequency in the ringing time. The carrier could be detected by sensing the voltage across a secondary winding 1612 at the other side of the transformer isolation. In this example, signal transmission and reception may be achieved using prior art methods such as amplitude or frequency modulation, for example. As the carrier frequency can be chosen to be higher than the ringing frequency, it may be possible to communicate not only during the ringing time, but also during the primary and secondary strokes. Parasitic inductance in the transformer during the primary or secondary strokes could potentially provide impedance to prevent shorting of the transmitted carrier signal while one of the switches 1606, 1620 is on. The current source 1602 could be AC coupled by a capacitor to reduce interaction with the converter signals as much as possible. In such an example the current source 1602 is configured to provide an alternating current with a carrier frequency, the primary side controller 1608 is configured to modulate the carrier frequency in accordance with information to be communicated to the second winding 1614 in order to provide a transformer relayed signal. The secondary side controller 1618 may demodulate the signal to obtain the transformer relayed signal. Other than these steps, the operation of the SMPS in this example is similar to that described with reference to FIG. 16.

It will be appreciated that such a current source may also be provided in a SMPS that uses secondary side sensing and communicates information from the secondary side to the primary side.

Figure 17:
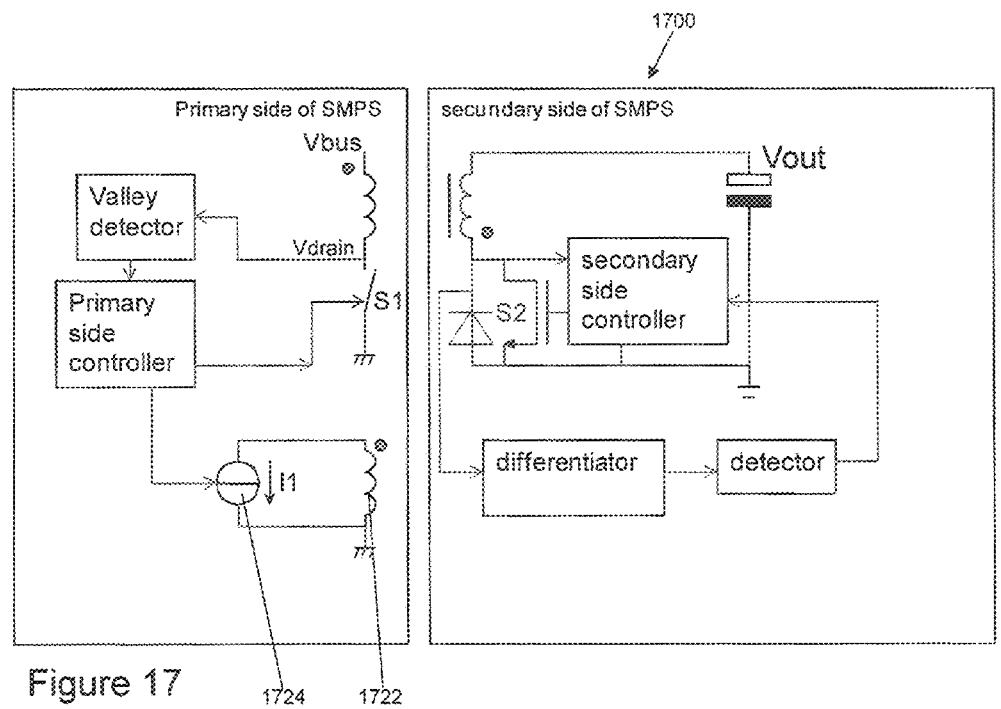
FIG. 17 illustrates a flyback converter that is similar to that of FIG. 16.

FIG. 17 illustrates a flyback converter 1700 that is similar to that of FIG. 16. Features that are common to both FIG. 16 and FIG. 17 will not necessarily be described again here.

The flyback transformer in FIG. 17 includes an auxiliary winding 1722 at the primary side. As will be appreciated from the following description, the auxiliary winding 1722 is used to communicate information from the primary side to the secondary side.

A communication current source 1724 is coupled across the auxiliary winding 1722 and controlled by the primary side controller. When the primary side controller is to communicate information across the transformer it causes the current source 1724 to add a current to the auxiliary winding 1722 in a similar way to how the current source adds a current to the primary winding in FIG. 16. It will be appreciated that currents in the auxiliary winding 1722 are coupled to the secondary winding in the same way that currents in the primary winding are coupled to the secondary winding.

In some examples, use of such an auxiliary winding 1722 can be advantageous as less energy is required to be added to the auxiliary winding than the primary winding (as in FIG. 16) as there is no DC component across the auxiliary winding. In contrast, Vbus provides a DC component across the primary winding. Therefore, in certain applications, the communication provided by the flyback converter 1700 of FIG. 17 can result in only a small reduction in efficiency compared to the situation without communication.

One or more embodiments disclosed herein relate to flyback converters with mains isolation, or any other mains isolated converter, where intervals are available with free ringing oscillations. A switching action at the secondary performed during the free ringing oscillations side can be detected at the other side of the mains isolation.

Examples disclosed herein relate to a switch mode power converter including mains isolation and transfer of information across the mains isolation. A switch can be closed for a short instance around certain optimal moments (short time after the end of the secondary stroke, just before, at or just after the top of a free voltage ringing) in relation to certain intervals of the converter (end of secondary stroke, top of the ringing) in order to detect an effect at the other side of the mains isolation. The effect can be detected by detecting the amplitude of a voltage difference and define the state of a bit of information based on the amplitude of the voltage difference and the timing relation with respect to the optimal moments.

The switch mode power converter may be a flyback converter, which may include a secondary rectifier diode and separate switch for communication or a SR switch both for rectification and communication.

Information may be encoded just after the end of secondary stroke: SR pulse yes or no, if yes then distance to end of sec stroke equivalent to deltaV.

N switching cycles may be used, each including 1 end of secondary stroke+ encoded bit according to all possibilities. Can encode for N bits, bits could have more than 2 values, depending on the possibilities used.

Information may be encoded just after the end of a secondary stroke: more than one SR pulse distance between pulses, deltaV used for encoding.

More than 1 bit may be encoded per switching cycle, using the ringings after the end of the secondary stroke also, including option of using more than 1 SR pulse per ringing and to use pulse with certain time relation to the top.

Additional means may be provided to detect that a bit is not valid as the primary switch was turned on too close and configure the system to resend the lost bit.

It may be possible to start the communication at any time and use the possibility for communication that is available at a specific moment (end of a secondary stroke or top of a ringing oscillation) to encode a bit at one side of the mains isolation and decode the bit at the other side of the mains isolation until the desired information has been sent.

There may be provided a switch mode power converter including mains isolation and transfer of information across the mains isolation. A current pulse can be applied to a transformer for a short instance around certain optimal moments (around a top or valley of a free voltage ringing) in relation to certain intervals of the converter in order to adapt a resonating energy and detect a change in the resonating energy at the other side of the mains isolation and define the state of a bit of information based on the detected effect.

The bit of information may be used to start a bidirectional flyback stroke.

It will be appreciated that in alternative examples, operation of a component such as a secondary side switch on the secondary side may be controlled in accordance with an instruction provided from the primary side by sending information across the mains isolation of the transformer to the secondary side using techniques and apparatus related to any signalling capacitor as described herein.

It will be appreciated that any components that are described herein as being coupled or connected could be directly or indirectly coupled or connected. That is, one or more components could be located between two components that are said to be coupled or connected whilst still enabling the required functionality to be achieved.

The invention claimed is:

1. A switched-mode power supply comprising:
a transformer with a first winding and a second winding;
a transmitter configured to:
  detect a detectable variable (Vout) at the first winding,
  generate a transformer relayed signal in accordance with the detectable variable (Vout), and
  provide the transformer relayed signal to the first winding; and
a receiver configured to:
  receive the transformer relayed signal from the second winding, and
  control a controllable variable at the second winding in response to the transformer relayed signal,
wherein the transformer relayed signal is a symbol stream comprising a plurality of symbols.

2. The switched-mode power supply of claim 1, wherein the first winding is a secondary side winding of the transformer and the second winding is a primary side winding of the transformer, the switched-mode power supply further comprising a power switch coupled in series with the primary side winding, wherein the controllable variable relates to a state of the power switch, and wherein the first winding is configured and arranged to transfer the transformer relayed signal to the second winding via inductive coupling.

3. The switched-mode power supply of claim 2, further comprising a secondary side switch coupled in series with the secondary side winding, wherein the transmitter generates a transformer relayed signal by operating the secondary side switch to encode information indicative of the detectable variable as compared to a target value.

4. The switched-mode power supply of claim 3, wherein the switched-mode power supply is a flyback converter and the transmitter is configured to operate the secondary side switch during a ringing time in the operation of the switched-mode power supply, wherein the ringing time includes a time between an end of a demagnetization period and a start of a magnetization period of the flyback converter.

5. The switched-mode power supply of claim 4, wherein the transmitter is configured to operate the secondary side switch at an instant at, or adjacent to, a maxima or minima in a voltage across the secondary winding during a ringing time in the operation of the switched-mode power supply, wherein the transformer relayed signal includes information indicative of the detectable variable encoded onto a ringing time portion of a voltage waveform.

6. The switched-mode power supply of claim 2, wherein the transmitter is configured to provide at least a portion of the symbol stream during a ringing time between a secondary stroke of a cycle and a primary stroke of a next cycle of the switched-mode power supply and to provide a further portion of the symbol stream during a ringing time between a secondary stroke of the next cycle or a subsequent cycle and a primary stroke of the cycle after the next or subsequent cycle.

7. The switched-mode power supply of claim 1, wherein the second winding is a secondary side winding of the transformer and the first winding is a primary side winding of the transformer, the switched-mode power supply further comprising a secondary side switch coupled in series with the secondary side winding, wherein the controllable variable relates to a state of the secondary side switch and wherein the transformer relayed signal is generated by adding voltage to the first winding that is representative of the detectable variable as compared to a target value.

8. A switched-mode power supply comprising:
a transformer with a first winding and a second winding;
a communication current source associated with the first winding;
a transmitter associated with the first winding, the transmitter configured to operate the communication current source in order to adjust the voltage across the first winding in accordance with information to be communicated to the second winding, thereby generating a transformer relayed signal; and
a receiver associated with the second winding, the receiver configured to:
  receive the transformer relayed signal from the second winding, and
  control a controllable variable at the second winding in response to the transformer relayed signal.

9. The switched-mode power supply of claim 8, wherein the transmitter is configured to operate the communication current source in order to adjust the voltage across the first winding during a ringing time between a secondary stroke of a cycle and a primary stroke of a next cycle of the switched-mode power supply and wherein the transformer relayed signal is generated by adding voltage to the first winding that is representative of the information.

10. The switched-mode power supply of claim 8, wherein the first winding is a primary winding and the second winding is a secondary winding, and further comprising a secondary side switch in series with the secondary winding, wherein the receiver is configured to control the state of the secondary side switch (in order to close the secondary side switch before the start of a primary stroke of the switched mode power supply in accordance with the transformer relayed signal, wherein the first winding is configured and arranged to transfer the transformer relayed signal to the second winding via inductive coupling of the first winding and the second winding.

11. The switched-mode power supply of claim 8, wherein the current source is configured to provide an alternating current with a carrier frequency, and the transmitter is configured to modulate the carrier frequency in accordance with information to be communicated to the second winding in order to provide the transformer relayed signal.

12. A switched-mode power supply comprising:
a transformer with a primary side winding and a secondary side winding;
a secondary side switch coupled in series with the secondary side winding;
a transmitter configured to:
  detect a detectable variable at the primary side winding,
  generate a transformer relayed signal in accordance with the detectable variable by adding voltage to the secondary side winding that is representative of the detectable variable as compared to a target value, and
  provide the transformer relayed signal to the primary side winding; and
a receiver configured to:
  receive the transformer relayed signal from the secondary side winding, and
  operate the secondary side switch in response to the transformer relayed signal.

13. The switched-mode power supply of claim 12, wherein the detectable variable is indicative of one of: a voltage, a power, or a current, and wherein the secondary side winding is configured and arranged to transfer the transformer relayed signal from the transmitter to a receiver via inductive coupling of the primary side winding and the secondary side winding.

14. The switched-mode power supply of claim 12, wherein the transmitter is configured to provide the transformer relayed signal during a ringing time between a secondary stroke of a first cycle and a primary stroke of a next cycle of the switched-mode power supply.

15. The switched-mode power supply of claim 13, wherein the transformer relayed signal comprises an additional change of a current in, or voltage across, a winding of the transformer.

16. The switched-mode power supply of claim 12, wherein the transmitter includes:

an error amplifier configured and arranged to receive a signal representative of the detectable variable and compare the detectable variable to the target value;

a communication encoder circuit configured and arranged to receive an error signal from the error amplifier based on the comparison and encode the error signal into a switch control signal; and the secondary side switch configured and arranged to receive the switch control signal and generate the transformer relayed signal using the switch control signal.

17. The switched-mode power supply of claim 16, wherein the transmitter includes controller circuitry configured and arranged to provide timing information to the communication encoder circuit, wherein the timing information includes a current state of operation of the switched-mode power supply and a determined end of a secondary stroke.

18. The switched-mode power supply of claim 17, wherein the transmitter includes a current source configured and arranged in parallel with the secondary side switch, wherein the communication encoder circuit provides the control signal to the current source and the current source is configured and arranged provide additional voltage to the secondary side winding by providing a pulse of additional current through the secondary side winding.

19. The switched-mode power supply of claim 12, wherein the receiver includes:

communication decoder circuit configured and arranged to identify the transformer relayed signal communicated from the secondary side winding by monitoring voltage across the primary side winding and provide a control signal to a flyback controller circuit;

the flyback controller circuit configured and arranged to set operation of a power switch in response to the control signal by varying a gate of the power switch; and the power switch.

20. The switched-mode power supply of claim 19, wherein the receiver further includes:

a communication current source in parallel with the power switch, and configured and arranged to provide current to the primary side winding; and a primary side controller circuit configured and arrange to operate the communication current source by adjusting a voltage across the primary side winding in accordance with information to be communicated to the secondary side winding, thereby generating another transformer relayed signal.

\* \* \* \* \*